(12) United States Patent
Smith

(10) Patent No.: US 7,653,632 B2
(45) Date of Patent: Jan. 26, 2010

(54) FILE SYSTEM FOR STORING MULTIPLE FILES AS A SINGLE COMPRESSED FILE

(75) Inventor: Alan G. Smith, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1733 days.

(21) Appl. No.: 10/261,356

(22) Filed: Oct. 1, 2002

(65) Prior Publication Data

US 2004/0064462 A1    Apr. 1, 2004

(51) Int. Cl.
*G06F 7/00* (2006.01)
*G06F 17/30* (2006.01)

(52) U.S. Cl. ............................. 707/10; 707/9; 707/101; 707/102; 707/202; 707/204

(58) Field of Classification Search .................... 707/1, 707/200, 204, 205
See application file for complete search history.

(56) References Cited

U.S. PATENT DOCUMENTS

| 5,652,265 | A  | * | 7/1997  | Vittori et al. ................. 514/548 |
| 5,778,395 | A  | * | 7/1998  | Whiting et al. .............. 707/204 |
| 5,931,935 | A  | * | 8/1999  | Cabrera et al. .............. 710/260 |
| 6,895,591 | B1 | * | 5/2005  | Russ et al. ................... 719/332 |
| 7,007,046 | B2 | * | 2/2006  | Manley et al. .............. 707/204 |
| 7,031,987 | B2 | * | 4/2006  | Mukkamalla et al. ........ 707/204 |
| 2002/0129047 | A1 | * | 9/2002  | Cane et al. ................... 707/204 |
| 2003/0004947 | A1 | * | 1/2003  | Coverston ...................... 707/9 |
| 2003/0009538 | A1 | * | 1/2003  | Shah et al. ................... 709/219 |
| 2003/0084020 | A1 | * | 5/2003  | Shu ............................... 707/1 |
| 2003/0208759 | A1 | * | 11/2003 | Gordon et al. ................ 725/46 |

* cited by examiner

*Primary Examiner*—Hosain T Alam
*Assistant Examiner*—Usmaan Saeed
(74) *Attorney, Agent, or Firm*—Mirna Abyad; Wade J. Brady, III; Frederick J. Telecky, Jr.

(57) ABSTRACT

A file archive system for storing multiple files and directories as a single file. The file archive system could be used on a hand-held computer or other computing device. The file archive system in a preferred embodiment has an operating system with a loadable file system. In another embodiment, the file archive system includes a file archive structure for storing multiple files as a single file.

6 Claims, 3 Drawing Sheets

FILE SYSTEM FOR STORING MULTIPLE FILES AS A SINGLE COMPRESSED FILE

TECHNICAL FIELD OF THE INVENTION

This invention relates to electronic computing devices and software on those devices, and more particularly to a method for storing a group of data files as a single compressed file, which can then have it components edited.

BACKGROUND OF THE INVENTION

It is often desirable to store files in a compressed file format to conserve memory. This is particularly beneficial on hand-held devices that have limited memory. Data files stored together are often stored in a block-based file system. In a block-based system, small files take up a disproportionate amount of space because nearly a full block may be wasted for each stored file. It is also desirable to store a group of related files together with a way to access the files in a way so they appear as a block of files on a disk or in a directory.

SUMMARY OF THE INVENTION

The present invention provides a file archive system for storing multiple files as a single file. The file archive system could be used on a hand-held computer or other computing device. The file archive system in a preferred embodiment has an operating system with a loadable file system.

In another embodiment, the file archive system includes a file archive structure for storing multiple files as a single file. This is advantageous to allow grouping of related files to be stored together. Further a directory of several files can be stored as a single file and a directory tree can be stored as a single file.

An advantage of the present invention is that wasted space in the file is minimized. Data files are stored in memory into spaces of the size of the data file with no fixed block size. Speed is also optimized by the ability of information blocks and file contents to be mingled with each other throughout the file.

DETAILED DESCRIPTION OF THE INVENTION

Figure 1:
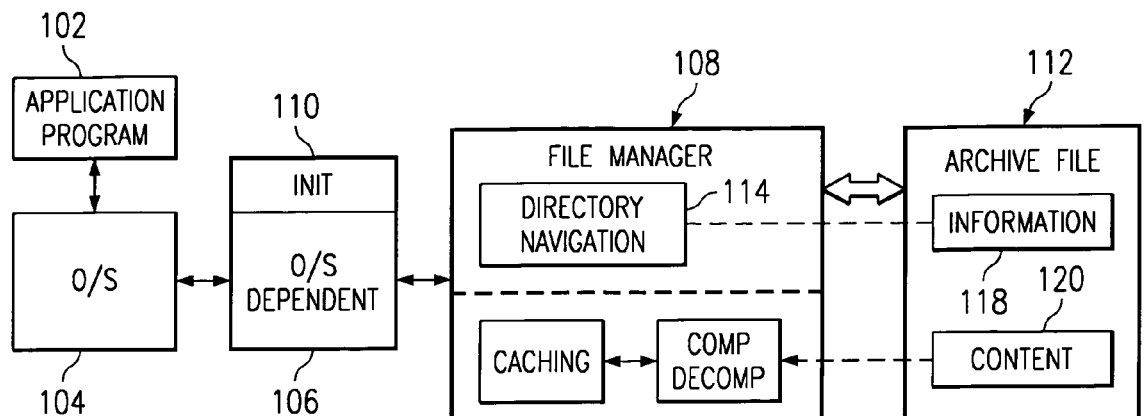
FIG. 1 illustrates a file archive system for a computer device according to an embodiment of the present invention.

An embodiment of the present invention is a file archive system illustrated in FIG. 1. The file archive system could be used on a hand-held computer or other computing device such as the device described below and shown in FIG. 4. The file archive system in FIG. 1 is a preferred embodiment that has an operating system with a loadable file system. As shown in FIG. 1, an application program 102 interfaces with the operating system 104. The file archive system includes a portion of code that is operating system dependant 106 that communicates between the file manager 108 and the operating system 104. An initialization portion of code 110 initializes the file archive system. The file manager 108 creates and manages the archive file 112 stored in a memory system such as in RAM or on a hard disk drive (not shown).

Again referring to FIG. 1, the file manager 108 has two major functions, directory navigation 114 and read/write files 116. The directory navigation function 114 performs housekeeping tasks associated with moving through the archive file structure. The navigation function communicates primarily with the information blocks 118 in the archive file 112. The navigation function reads the information blocks 118 after accessing the file header 204 as described below. The read/write files function 116 of the file manager writes file data to the archive file contents blocks 120. The read/write files function 116 caches individual files before compression/decompression. Compressed files are then stored in the content blocks 120 of the archive file.

Figure 2:
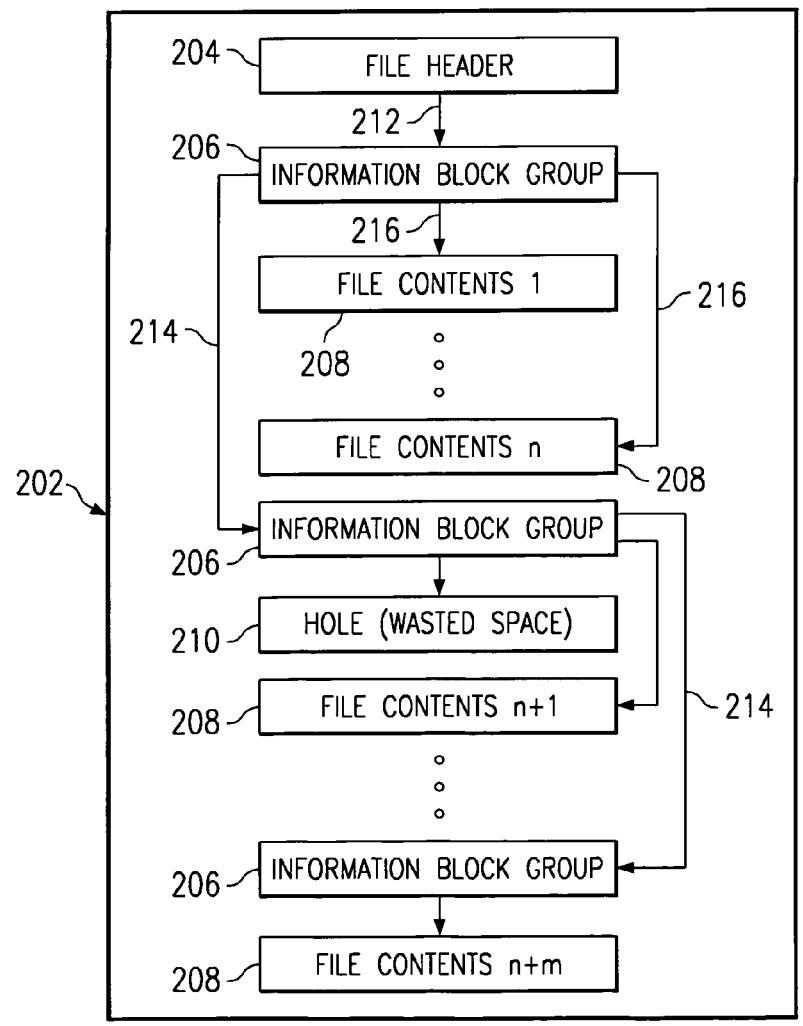
FIG. 2 illustrates a computer file structure according to an embodiment of the present invention.

An embodiment of the present invention is a file structure 202 illustrated in FIG. 2. The file structure could be used on a hand-held computer or other computing device such as the device described below and shown in FIG. 3. As shown in the figure, the file structure has 4 main components, a file header 204, information block groups 206, file data 208, and wasted space 210.

The file header 204 is the first thing in the archive file 202. It contains version information as well as a pointer 212 to the first information block group 206.

The second component of the file structure 202 is the information block group 206. An information block group can be located anywhere in the file after the file header. An information block group contains a pointer 214 to the next information block group (which can be either after it or before it in the file.) An information block group also contains pointers 216 to any file contents associated with files of that group. It also contains all directory information for files associated with that group.

Each block group described in FIG. 2 is made of a series of file/dir information blocks. In the preferred embodiment, the block types are link block, directory block, file block and big file block. The block group has one directory or file block which can be followed by more directory blocks or file blocks in any order. The block group ends with a link block to provide the link to the next block group or an end of file code.

Each file/dir information block has a first byte that is in a common format. The contents of the first byte of the file/dir information block 208 is formatted as shown in Table 1. The first byte (Byte 0) bit 7 specifies whether it is active. Active means the block has not been deleted. If a file is deleted, the active bit can be set and the space left as empty or wasted space. When a file is modified and can no longer fit in the same space, it would need to be saved in a new bigger space and the previous space marked as inactive. The active bit increases performance by not requiring the moving of other info blocks in a grouping when a file is deleted. The active bit set also means that the space held by the inactive info block is still being used and it won't be reclaimed until the entire archive file is compacted.

The next two bits in the first byte of the file/dir information block 208 are reserved. Bits 4 and 3 describe the type of block, whether link, directory, file or big file. The remaining bits 2, 1, and 0 are the permissions; read, write and execute permission. (Permissions are only applicable for directories, files, and big files.)

TABLE 1

| Bit 7 | Bits 6-5 | Bits 4-3 | Bit 2 | Bit 1 | Bit 0 |
|---|---|---|---|---|---|
| Active (1 is live, 0 is deleted) | Reserved (MUST BE 00) | Type: 00: link 01: directory 10: file 11: big file (> 64K) | Read Permission | Write Permission | Execute Permission |

After the first byte of the information blocks, the remaining information in a file/dir information block depends on the type of block. In a preferred embodiment the types of blocks are link, directory, file, and big file. Other block types could be added using the reserved bits.

A link block is a pointer to the next information block in the next information block group. For a link block, bytes 1-4 indicate the address offset to the next information block. A value of −1 in bytes 1-4 mean an end of file.

A Directory block contains information about a directory. For a directory block, bytes 1-2 indicate the parent ID of the present block. Further, bytes 3-4 indicate the ID of the present directory block. Bytes 5-8 indicate the date and time the block was created. Byte 9 indicates the length of the name of the block which is stored in bytes 10+ length of the name indicated in byte 9. A directory block essentially describes a name for a logical directory. The directory block does not store links or information about its children like in a conventional directory. Children (files and directories) store what directory they lie in by storing the parent ID. There is no significance to where a directory resides in the archive hierarchy of information block groups. Thus files or directories in a directory may reside in the same information block group or in another information block group.

A File block is an information block related to a file in the archive. For a file block, bytes 1-2 indicate the parent ID of the present block. Further, bytes 3-6 indicate the file offset of the associated data. Bytes 7-10 indicate the date and time the block was created. Bytes 11-12 indicates the compressed file and bytes 13-14 the size of the file uncompressed. Byte 15 indicates the length of the name of the block which is stored in bytes 16+length of the name indicated in byte 15.

A big File block is an information block related to a file in the archive which is greater than 64K. For a file block, bytes 1-2 indicate the parent ID of the present block. Further, bytes 3-6 indicate the file offset of the associated data. Bytes 7-10 indicate the date and time the block was created. Bytes 11-14 indicates the compressed file and bytes 15-18 the size of the file uncompressed. Byte 19 indicates the length of the name of the block which is stored in bytes 20+length of the name indicated in byte 19.

TABLE 2

| Type | Byte Information |
|---|---|
| Link | Bytes 1-4: Next Offset (−1 means end of file) |
| Directory | Bytes 1-2: Parent ID |
| | Bytes 3-4: ID |
| | Bytes 5-8: Date Time |
| | Byte 9: name Length |
| | Bytes 10 + n: Name |
| File | Bytes 1-2: Parent ID |
| | Bytes 3-6: File Offset |
| | Bytes 7-10: Date Time |
| | Bytes 11-12: Size Compressed |
| | Bytes 13-14: Size Uncompressed |
| | Byte 15: name Len |
| | Bytes 16 + n: Name |
| Big File (>64K) | Bytes 1-2: Parent ID |
| | Bytes 3-6: File Offset |
| | Bytes 7-10: Date Time |
| | Bytes 11-14: Size Compressed |
| | Bytes 15-18: Size Uncompressed |
| | Byte 19: name Len |
| | Bytes 20 + n: Name |

Figure 3:
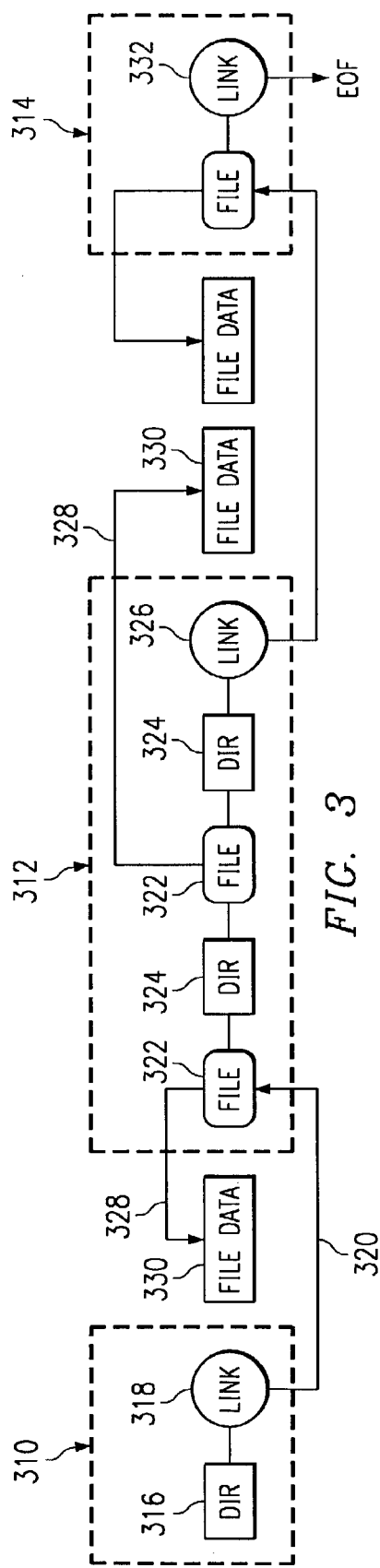
FIG. 3 illustrates a computer file structure according to an embodiment of the present invention.

An example of a file structure according to an embodiment of the present invention is shown in FIG. 3. Information blocks are grouped together in block groups 310, 312, 314. The first block group 310 has a directory block 316 followed by a link block 318. The link block 318 has a pointer 320 that points to the first dir/file block of the next block group 312. Block group 312 has two file blocks 322, two directory blocks 324 and a link block 326. The file blocks 322 have a pointer 328 to file data 330. Each group has as the last element a link block. The link block links to the start of the next group or holds the value 0xFFFF which designates that this is the end of the file (EOF) 322. While in this example link blocks always point to a later point in the file, link blocks don't have to be linear. Also, this example does not show any unused space. However, it would be possible to have unused space between the grouping of information blocks and the file data or between two sets of file data.

Figure 4:
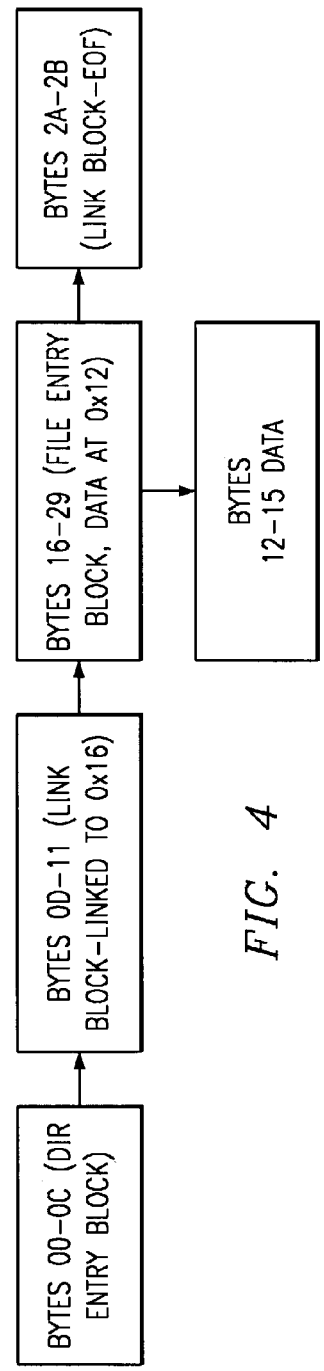
FIG. 4 illustrates a computer file example according to the structure of the present invention.

Another example of a file according to an embodiment of the present invention is shown in Table 3, Table 4 and FIG. 4. This example does not show a header block. Table 3 shows the raw contents of memory for a file containing a single data item. The Explanation of each data item is shown in Table 4. The file structure for this file is illustrated in FIG. 4.

TABLE 3

| Address | Contents of memory |
|---|---|
| 00000000 | 8e ff ff 00 00 3d 65 01 f4 03 74 69 7a 80 00 00 |
| 00000010 | 00 16 31 32 33 0a 96 00 00 00 00 00 12 3d 65 01 |
| 00000020 | fb 00 04 00 04 04 74 65 73 74 80 ff ff ff ff |

TABLE 4

| Offset | Data | Meaning |
|---|---|---|
| Directory Block | | |
| 0 | 8e | Active Dir block, read and write permissions |
| 1 | ff ff | Parent ID is −1 |
| 3 | 00 00 | Current ID is 0 |
| 5 | 3d 65 01 f4 | Time of last modification |
| 9 | 03 | Name is 3 bytes long |
| A | 74 69 7a | Name is "tiz" |
| Link Block | | |
| D | 80 | Active Link block |
| E | 00 00 00 16 | Next FIB is at offset x16 |
| File Data | | |
| 12-15 | 31 32 33 0a | File Contents (123\n) |
| File Block | | |
| 16 | 96 | Active File block, read/write permission |
| 17 | 00 00 | Parent ID is 0 |
| 1B | 00 00 00 12 | Offset of data is 12 |
| 1D | 3d 65 01 fb | Time of last modification |
| 21 | 00 04 | Size Compressed is 4 bytes |
| 23 | 00 04 | Size Uncompressed is 4 bytes |
| 25 | 04 | Name is 4 bytes long |
| 26 | 74 65 73 74 | Name is "test" |
| Link Block | | |
| 2A | 80 | Active Link block |
| 2B | ff ff ff ff | There is no next FIB |

An important feature of the present invention is that children keep track of their parents instead of the more typical method of parents keeping track of their children. This is to minimize the need for modifying other parts of the file when children are added or removed.

File contents can be anywhere in the file. The contents are always contiguous data from the first until the end. The data here is only file contents data (either compressed or regular). There is no pointer to any other information in the file contents area.

A hole can be anywhere in the file. This is simply wasted space in a file. When the TIZ file is compacted, all of these holes will go away. However, we allow holes to be created to minimize time when files in the archive are modified. A program can determine from looking at all of the file/dir information blocks what percentage of space is wasted and compact the archive.

Figure 5:
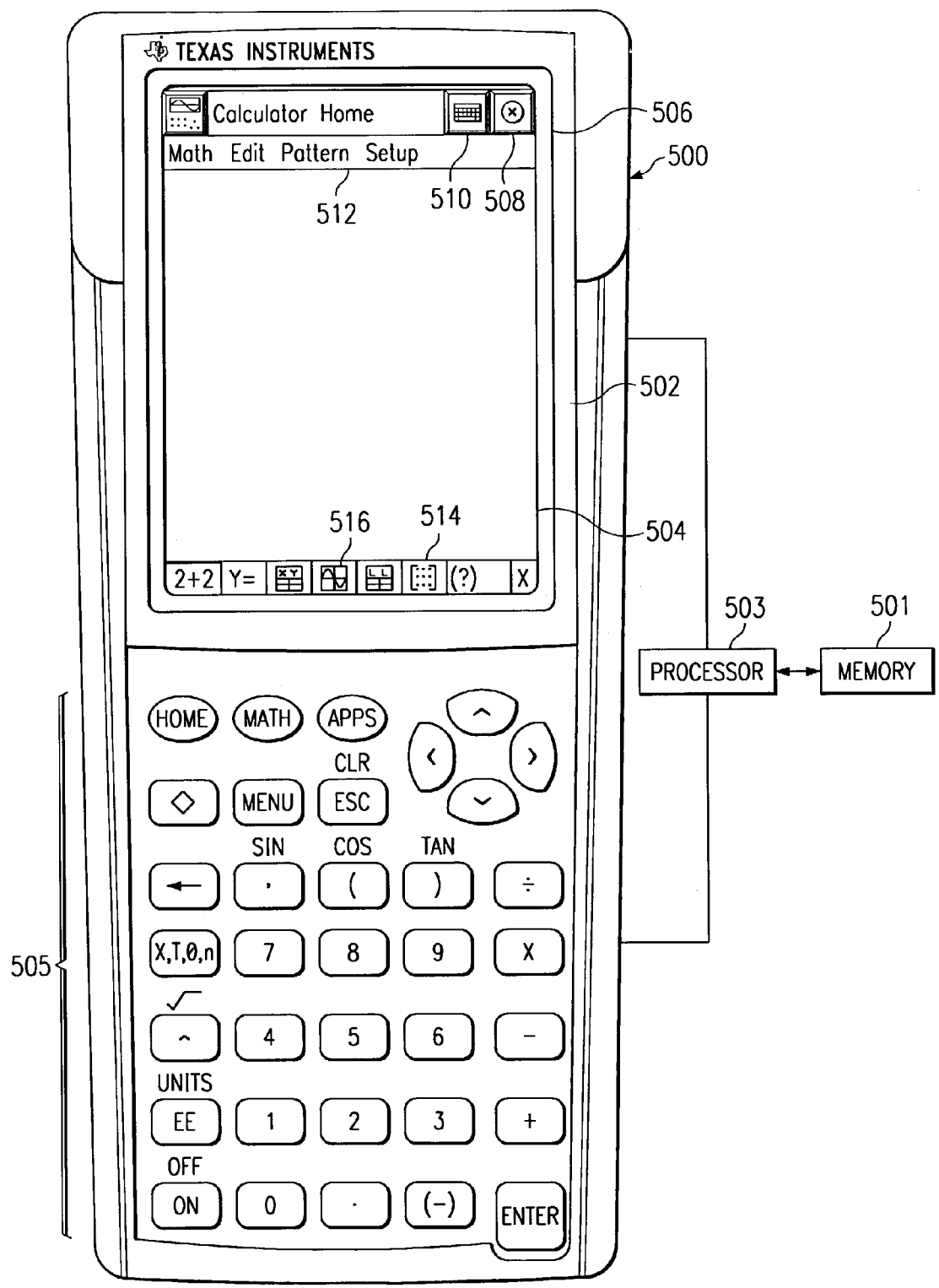
FIG. 5 illustrates a hand-held device having features according to the present invention.

FIG. 5 illustrates a computer or hand held computing device 500 that incorporates features of the present invention. The device executes software described herein stored in memory 501 on the processor 503. The device has a display screen 502 having a display area 504. In this embodiment, the display is a touch sensitive display that uses a stylus for input (not shown) as well as the keyboard 505.

The display includes a header bar 506 that shows the current tool (in this case a calculator home screen). The file name of the current open document on the display is also shown on the header bar. In addition, the header bar shows an icon for closing the tool 508 and a keyboard icon 510 to bring up a "QWERTY" keyboard on the display for input of characters with the stylus. The display area 504 further includes a top button bar 512 that has drop down menus for file, edit, insert and view functions. The display area 504 also has a bottom button bar 514 that has text formatting options, a keyboard button, and an icon 516 to pop-up another menu for inserting text symbols.

Other Embodiments

The previous embodiment was described with reference to a file archive system in conjunction with an operating system with a loadable file system. Other embodiment are contemplated where the operating system uses a fixed file system. This embodiment would appear as that described except the O/S dependent code block 106 may not be present.

In a further embodiment, the application software may deal directly with the archive file 112 through the file manager 108. In either of these embodiments, the file manager would operate in the manner described above with the archive file and the file structure also described above.

Although the present invention has been described in detail, it should be understood that various changes, substitutions, and alterations could be made hereto without departing from the spirit and scope of the invention as defined by the appended claims.

The features that are the subject of the present invention could be incorporated into other into other computer based teaching tools and computers. Similarly, other embodiments include the same user interface functionality in a ROM software application package that is executed on a computer, graphing calculator or other handheld device.

What is claimed is:

1. A handheld computing device with a file archive system for storing multiple files as a single file comprising comprising:
   a display screen;
   an input device for operating the computing device and entering user responses;
   a processor for executing programming that provides the file archive system further comprising:
      a file manager that communicates with an archive file, having a directory navigation system and a read/write file system, and wherein the archive file comprises:
         a fixed header in the file that does not change when files are added to the archive, and that contains a first pointer to a first file information block group,
         the first information block group containing a link block having a second pointer to a second information block group, and
         a first file information block in the first information block group containing a third pointer which points to a first data file, and
         a second file information block in the second information block group containing a fourth pointer, or, alternatively, an end of file code.

2. The handheld computing device of claim 1, wherein the files in the archive file appear to an application software program to be files in a disk file directory.

3. The handheld computing device of claim 1, wherein at least one information block group further contains a directory block which contains directory information.

4. The handheld computing device of claim 1, further comprising an operating system with a loadable file system.

5. The handheld computing device of claim 3, wherein a file information block and a directory information block have a common format for information in the first byte thereof.

6. The handheld computing device of claim 5, wherein the common format for information in the first byte of the blocks includes a bit identifying a block type.

* * * * *

UNITED STATES PATENT AND TRADEMARK OFFICE
CERTIFICATE OF CORRECTION

PATENT NO. : 7,653,632 B2
APPLICATION NO. : 10/261356
DATED : January 26, 2010
INVENTOR(S) : Alan G. Smith It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2046 days.

Signed and Sealed this

Twenty-eighth Day of December, 2010

David J. Kappos
*Director of the United States Patent and Trademark Office*